United States Patent
Ono

(10) Patent No.: US 9,659,523 B2
(45) Date of Patent: May 23, 2017

(54) DISPLAY PANEL AND DISPLAY PANEL DRIVING METHOD

(71) Applicant: JOLED INC., Tokyo (JP)

(72) Inventor: Shinya Ono, Osaka (JP)

(73) Assignee: JOLED INC., Tokyo (JP)

(*) Notice: Subject to any disclaimer, the term of this patent is extended or adjusted under 35 U.S.C. 154(b) by 6 days.

(21) Appl. No.: 14/779,767

(22) PCT Filed: Jul. 4, 2014

(86) PCT No.: PCT/JP2014/003565
§ 371 (c)(1),
(2) Date: Sep. 24, 2015

(87) PCT Pub. No.: WO2015/019543
PCT Pub. Date: Feb. 12, 2015

(65) Prior Publication Data
US 2016/0055790 A1    Feb. 25, 2016

(30) Foreign Application Priority Data
Aug. 5, 2013  (JP) .................................. 2013-162811

(51) Int. Cl.
*G09G 3/30* (2006.01)
*H02M 3/158* (2006.01)
(Continued)

(52) U.S. Cl.
CPC .............. *G09G 3/30* (2013.01); *G09G 3/3233* (2013.01); *H02M 3/158* (2013.01);
(Continued)

(58) Field of Classification Search
CPC ........... G09G 3/3233; G09G 2330/021; G09G 2330/028; G09G 2300/0842; G09G 3/30;
(Continued)

(56) References Cited

U.S. PATENT DOCUMENTS 6,166,562 A    12/2000  Mita et al.
6,580,409 B1    6/2003  Ito et al.
(Continued)

FOREIGN PATENT DOCUMENTS

JP    09-322560    12/1997
JP    10-242831    9/1998
(Continued)

OTHER PUBLICATIONS

U.S. Appl. No. 14/942,028 to Hitoshi Tsuge, filed Nov. 16, 2015.
(Continued)

*Primary Examiner* — Alexander Eisen
*Assistant Examiner* — Abhishek Sarma
(74) *Attorney, Agent, or Firm* — Greenblum & Bernstein, P.L.C.

(57) ABSTRACT

Display panel includes: a power supply unit that generates first power supply voltage and variable second power supply voltage; and first and second power supply lines that transmit the first and second power supply voltages, respectively, to light emitting elements. The power supply unit (i) includes: first and second input terminals; a switching control unit; an inductor having first terminal connected to the second power supply line; a first switch element that switches conduction/non-conduction between a second terminal of the inductor and the first input terminal; a second switch element that switches conduction/non-conduction between the second terminal and the second input terminal; a capacitor having first electrode to which constant voltage is applied; and a third switch element that switches conduction/non-conduction between the second terminal and a second electrode of the capacitor, and (ii) collects, into the capacitor, and regenerates power from parasitic capacitance of the second power supply line.

6 Claims, 15 Drawing Sheets

(51) Int. Cl.
*G09G 3/3233* (2016.01)
*H02M 3/07* (2006.01)
*H02M 1/00* (2006.01)

(52) U.S. Cl.
CPC .............. *G09G 2300/0842* (2013.01); *G09G 2330/021* (2013.01); *G09G 2330/028* (2013.01); *H02M 3/07* (2013.01); *H02M 2001/0048* (2013.01); *Y02B 70/1491* (2013.01)

(58) Field of Classification Search
CPC ......... H02M 3/158; H02M 2001/0048; H02M 3/07; Y02B 70/1491
See application file for complete search history.

(56) References Cited

U.S. PATENT DOCUMENTS

| | | |
|---|---|---|
| 8,217,687 B2 | 7/2012 | Iwabuchi et al. |
| 2011/0089980 A1 | 4/2011 | Iwabuchi et al. |
| 2012/0099232 A1 | 4/2012 | Kuroyabu et al. |

FOREIGN PATENT DOCUMENTS

| | | |
|---|---|---|
| JP | 11-143426 | 5/1999 |
| JP | 2000-298455 | 10/2000 |
| JP | 2011-014738 | 1/2011 |
| JP | 2011-090805 | 5/2011 |
| JP | 2013-076775 | 4/2013 |

OTHER PUBLICATIONS

International Search Report (ISR) from International Searching Authority (Japan Patent Office) in International Pat. Appl. No. PCT/JP2014/003565, dated Oct. 7, 2014.

Non-light-emitting period 1: t1 ≤ t < t2

Positive voltage discharging

Non-light-emitting period 2: t2 ≤ t < t3

Negative voltage accumulation

Light-emitting period 1: t3 ≤ t < t4

Negative voltage discharging

Light-emitting period 2: t4 ≤ t < t5

Non-light-emitting period 1: t1 ≤ t < t2

Non-light-emitting period 2: t2 ≤ t < t3

Light-emitting period 1: t3 ≤ t < t4

Negative voltage discharging

Light-emitting period 2: t4 ≤ t < t5

DISPLAY PANEL AND DISPLAY PANEL DRIVING METHOD

TECHNICAL FIELD

The present disclosure relates to a display panel and a display panel driving method, and particularly to a technique for supplying power to a display panel.

BACKGROUND ART

Conventionally, image display devices often use display panels including an array of pixel units that allow individual light-emission control. An example of such display panels is the organic electroluminescence (EL) display panel. Organic EL display panels have excellent characteristics, such as being thin and light, and having high-speed responsiveness and a wide viewing angle, and are expected to have a promising future. Recent years have seen increased research and development geared toward increasing size, reducing energy consumption, and improving picture quality of organic EL panels.

For example, Patent Literature (PTL) 1 and PTL 2 disclose techniques for improving power efficiency in a driving circuit for a capacitive load. These documents disclose techniques which improve power efficiency in a circuit that drives, as a capacitive load, an EL element having a parasitic capacitance, by collecting the electrical charge that was charged in the EL element, into a capacitor, and reusing the collected electrical charge.

CITATION LIST

Patent Literature

[PTL 1] Japanese Unexamined Patent Application Publication No. 2011-90805
[PTL 2] Japanese Unexamined Patent Application Publication No. 09-322560

SUMMARY OF INVENTION

However, the conventional techniques have not adopted effective measures against power loss caused by the parasitic capacitance of a power supply line.

The present disclosure is conceived in view of the above-described circumstances and has as an object to provide a display panel suitably configured for reducing power loss caused by charging a parasitic capacitance of a power supply line, and a method of driving the same.

In order to solve the aforementioned problem, a display panel according to an aspect of the present disclosure includes: a plurality of light-emitting elements; a power supply unit configured to generate, from an input power supply voltage, a first power supply voltage used for light emission by the plurality of light-emitting elements and a second power supply voltage which is variable; a first power supply line that transmits the first power supply voltage from the power supply unit to the plurality of light-emitting elements; and a second power supply line that transmits the second power supply voltage from the power supply unit to the plurality of light-emitting elements, wherein the power supply unit includes: a pair of input terminals to which the input power supply voltage is applied; a switching control unit; an inductor having a first terminal connected to the second power supply line; a first switch element that is controlled by the switching control unit and switches between a conducting state and a non-conducting state between a second terminal of the inductor and one of the pair of input terminals; a second switch element that is controlled by the switching control unit and switches between the conducting state and the non-conducting state between the second terminal of the inductor and the other of the pair of input terminals; a capacitor having a first electrode to which a constant voltage is applied; and a third switch element that is controlled by the switching control unit and switches between the conducting state and the non-conducting state between the second terminal of the inductor and a second electrode of the capacitor, and the switching control unit is configured to: place (i) one of the first switch element and the second switch element and (ii) the third switch element in mutually-exclusive states of conduction to accumulate electric charge in the capacitor using current flowing to the inductor, when the second power supply voltage is set to a first voltage; and place the third switch element in the conducting state to charge a parasitic capacitance of the second power supply line using the electric charge accumulated in the capacitor, when the second power supply voltage is changed from the first voltage to a second voltage.

It should be noted that a generic or specific aspect may be implemented as a system, an integrated circuit, a computer program, or a computer readable recording medium such as a CD-ROM. Furthermore, a generic or specific aspect may be implemented by an arbitrary combination of a system, a method, an integrated circuit, a computer program, or a recording medium.

According to the present disclosure, power is collected from an inductor into a capacitor and regenerated for charging the parasitic capacitance of a power supply line, and thus power loss can be reduced.

Figure 1:
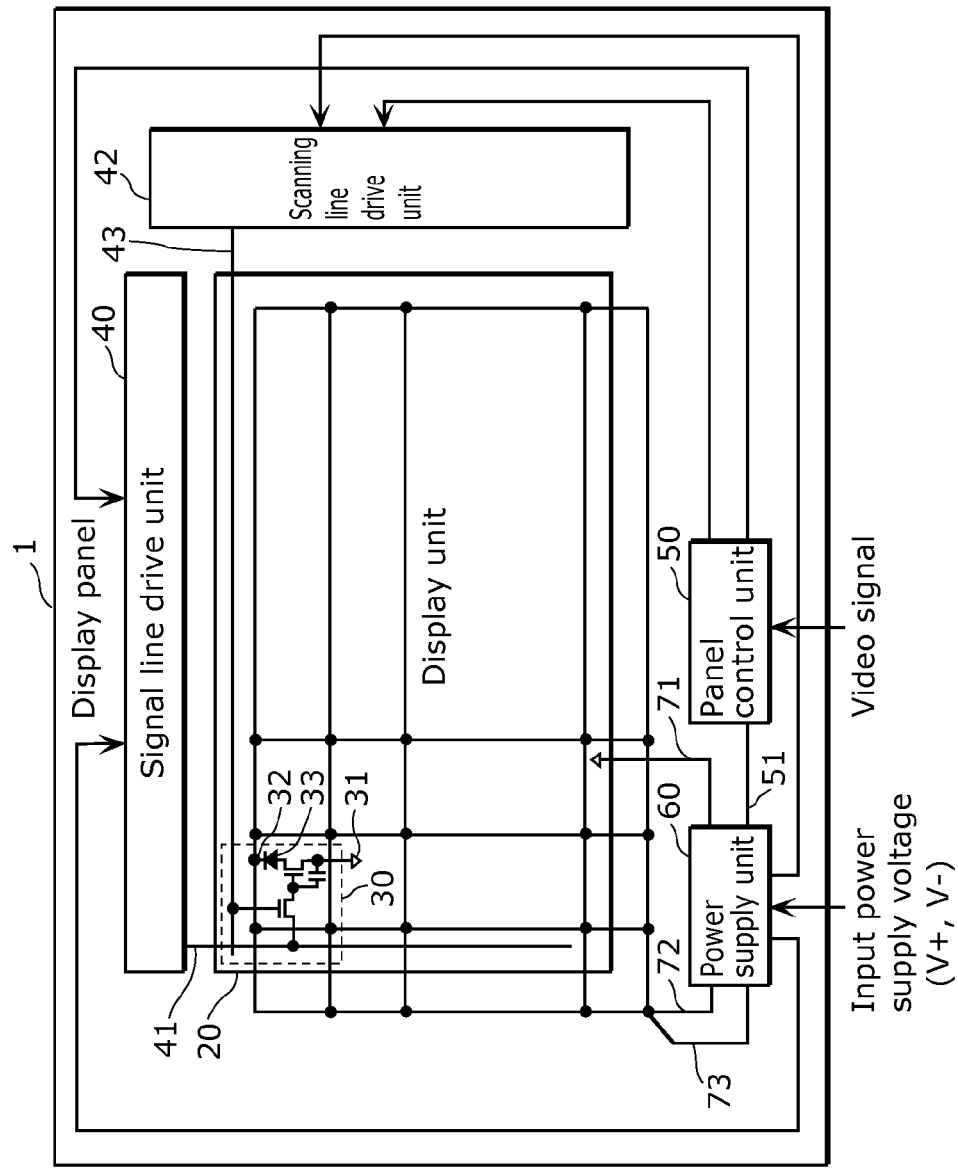
FIG. 1 is a function block diagram illustrating an example of a display device including a display panel in an embodiment.

DESCRIPTION OF EMBODIMENTS (Underlying Knowledge Forming the Basis of the Present Disclosure)

The inventor has found that the problems described below occur with regard to the power loss caused by the parasitic capacitance of the power supply line in the display panels described in the Background Art section.

Aside from the organic EL display panel, a typical display panel includes power supply lines for supplying operating power to plural pixel units. There exist in a power supply line, for example, parasitic capacitance generated by way of the power supply line crossing with another power supply line via an insulating layer, and parasitic capacitance between the anode and the cathode of an EL element itself. The parasitic capacitance of the power supply line causes loss of power efficiency in the display panel. For example, when changing voltage to be outputted in the power supply line for purposes such as controlling light-emission and non-light-emission in a pixel unit, power is consumed in order to charge/discharge the parasitic capacitance of the power supply line. Such power may be lost and thus does not contribute to the light-emission of the pixel units in a display panel. Typically, parasitic capacitance of the power supply line increases with the increase in size of the display panel. As a result, power loss for charging the parasitic capacitance of the power supply line increases, and power efficiency in the display panel is greatly compromised.

In order to solve such a problem, a display panel according to an aspect disclosed herein includes: a plurality of light-emitting elements; a power supply unit configured to generate, from an input power supply voltage, a first power supply voltage used for light emission by the plurality of light-emitting elements and a second power supply voltage which is variable; a first power supply line that transmits the first power supply voltage from the power supply unit to the plurality of light-emitting elements; and a second power supply line that transmits the second power supply voltage from the power supply unit to the plurality of light-emitting elements, wherein the power supply unit includes: a pair of input terminals to which the input power supply voltage is applied; a switching control unit; an inductor having a first terminal connected to the second power supply line; a first switch element that is controlled by the switching control unit and switches between a conducting state and a non-conducting state between a second terminal of the inductor and one of the pair of input terminals; a second switch element that is controlled by the switching control unit and switches between the conducting state and the non-conducting state between the second terminal of the inductor and the other of the pair of input terminals; a capacitor having a first electrode to which a constant voltage is applied; and a third switch element that is controlled by the switching control unit and switches between the conducting state and the non-conducting state between the second terminal of the inductor and a second electrode of the capacitor, and the switching control unit is configured to: place (i) one of the first switch element and the second switch element and (ii) the third switch element in mutually-exclusive states of conduction to accumulate electric charge in the capacitor using current flowing to the inductor, when the second power supply voltage is set to a first voltage; and place the third switch element in the conducting state to charge a parasitic capacitance of the second power supply line using the electric charge accumulated in the capacitor, when the second power supply voltage is changed from the first voltage to a second voltage.

With such a configuration, power can be collected from the inductor to the capacitor. Furthermore, since the collected power is regenerated in order to charge the parasitic capacitance of the second power supply line, the power loss resulting from the charging of the parasitic capacitance of the second power supply line can be reduced.

Furthermore, for example, in the display panel, the switching control unit may be configured to: place the second switch element and the third switch element in the mutually-exclusive states of conduction to accumulate the electric charge in the capacitor using the current flowing to the inductor, in a light-emitting period of the light-emitting element; and place the third switch element in the conducting state to charge the parasitic capacitance of the second power supply line using the electric charge accumulated in the capacitor, in a non-light-emitting period of the light-emitting element.

With such a configuration, a large amount of power can be collected and regenerated because power is collected into the capacitor in the light-emitting period in which a relatively large current flows to the inductor in order to cause the light-emitting element to emit light, and is regenerated in a non-light-emitting period. As a result, a significant power loss reducing effect can be obtained.

Furthermore, for example, in the display panel, the switching control unit may be configured to: place the second switch element and the third switch element in the mutually-exclusive states of conduction to accumulate the electric charge in the capacitor using the current flowing to the inductor, in a non-light-emitting period of the light-emitting element; and place the third switch element in the conducting state to charge the parasitic capacitance of the second power supply line using the electric charge accumulated in the capacitor, in a light-emitting period of the light-emitting element.

With such a configuration, power can be collected and regenerated without waste because even the relatively small amount of power that can be obtained in a non-light-emitting period is collected and then regenerated in the light-emitting period. As a result, a more significant power loss reducing effect can be obtained.

The present disclosure can be implemented not only as a display panel such as that described above but also as a method of driving such a display panel.

Hereinafter, an embodiment of the present disclosure shall be described with reference to the Drawings. It should be noted that, in the figures, substantially identical or equivalent elements are assigned the same reference signs, and overlapping description may be omitted. Furthermore, the embodiment described below shows a specific example of the present disclosure. The numerical values, shapes, materials, structural elements, the arrangement and connection of the structural elements, steps, the processing order of the steps, etc. shown in the subsequent embodiment are mere examples, and therefore do not limit the scope of the present disclosure. Among the structural elements in the subsequent embodiment, structural elements not recited in any one of the independent claims which indicate the broadest concepts of the present disclosure are described as arbitrary structural elements.

A display panel in the embodiment is a display panel that includes a matrix of pixel units that allow individual light-emission control. Furthermore, the display panel in the embodiment includes a capacitor, an inductor, and switch elements for collecting and regenerating energy accumulated in a parasitic capacitance of a power supply line for supplying driving power to the pixel units.

FIG. 1 is a function block diagram illustrating an example of a configuration of a display device 1 in Embodiment 1.

Display panel 1 includes a display unit 20, a signal line drive unit 40, a scanning line driving unit 42, a panel control unit 50, and a power supply unit 60.

The display unit 20 includes plural pixel units 30 which are arranged in a matrix. A data signal line 41 is provided to each column of the matrix, and is connected in common to the pixel units 30 arranged in the same column. Furthermore, a scanning signal line 43 is provided to each row of the matrix, and is connected in common to the pixel units 30 arranged in the same row.

Panel control unit 50 receives a video signal from the outside, and causes signal line drive unit 40 and scanning line drive unit 42 to display the image represented by the video signal, on the display unit 20.

The signal line drive unit 40 supplies a data signal corresponding to luminance to the pixel units 30 via the data signal lines 41.

The scanning line drive unit 42 supplies a control signal for controlling the operation of the pixel units 30, to the pixel units 30 via the scanning signal lines 43.

Each of the pixel units 30 is a circuit which causes a light-emitting element to emit light at a luminance corresponding to the data signal, and includes two transistors and one capacitor together with an organic EL element 33 which is the light-emitting element.

The power supply unit 60 regulates, for the operation of the display panel 1, input power supply voltages V+ and V− supplied from the outside, and distributes the regulated voltages to the respective components of the display panel 1. The power supply unit 60 generates, for example, a first power supply voltage for light-emission of the pixel units 30 and a second power supply voltage which is variable, from the input power supply voltages V+ and V−, and supplies the first and second power supply voltages to the display unit 20 via power supply lines 71 and 72. The second power supply voltage is regulated to equal a voltage that is instructed from the panel control unit 50 via a signal line 51. The power supply lines 71 and 72 are connected in common to all the pixel units 30.

Figure 2:
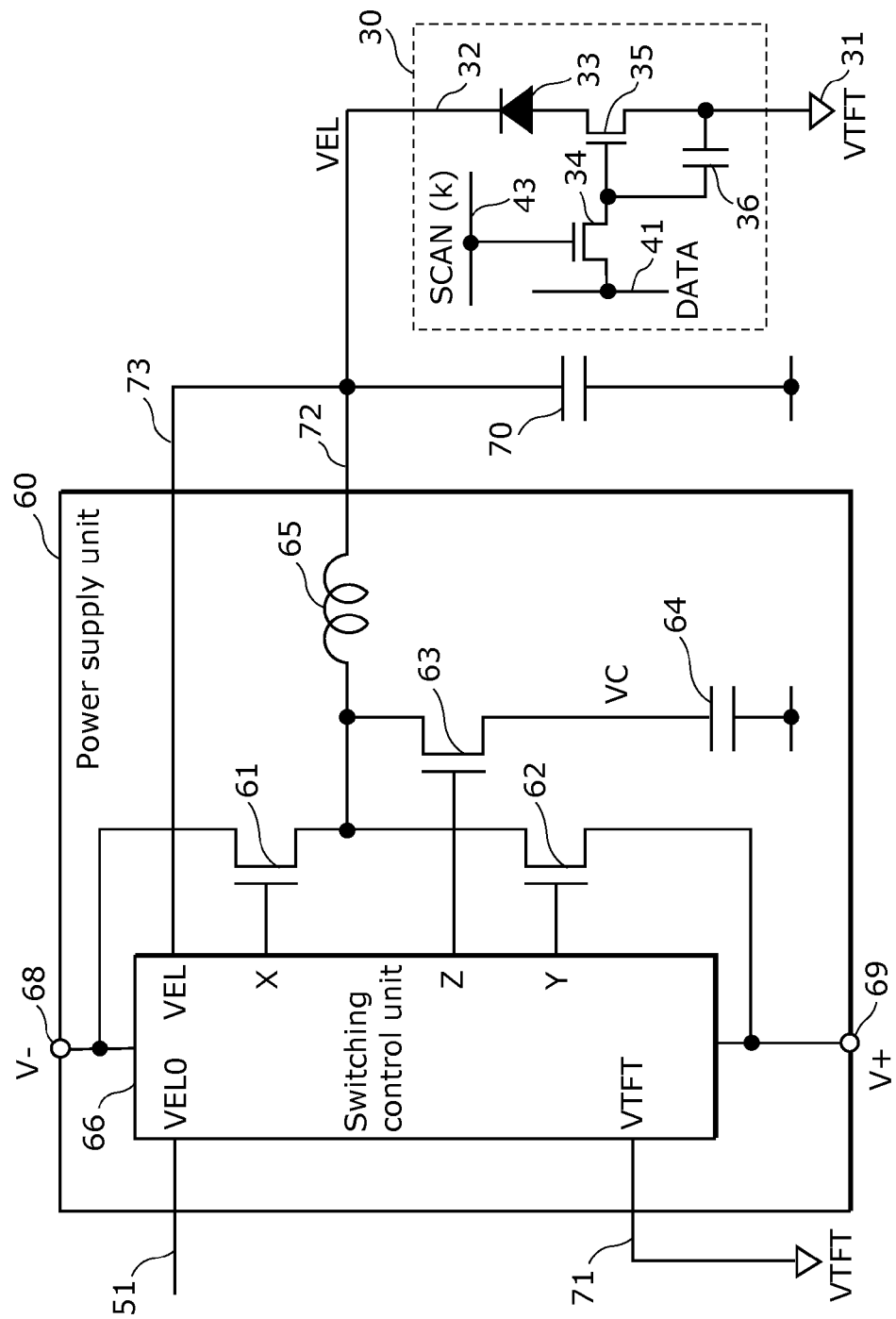
FIG. 2 is a circuit diagram illustrating an example of configurations of a power supply unit and a pixel unit in an embodiment.

FIG. 2 is a circuit diagram illustrating an example of the configurations of the power supply unit 60 and a pixel unit 30 and the connection between the power supply unit 60 and the pixel unit 30. FIG. 2 clearly illustrates a parasitic capacitance 70 of a power supply line 72.

In the power supply unit 60, transistors 61 and 62, an inductor 65, and a switching control unit 66 make up a switching regulator. A transistor 63, a capacitor 64, an inductor 65 perform collection and regeneration of power to be used in charging the parasitic capacitance 70 of the power supply line 72, under the control of the switching control unit 66. The switching control unit 66 is configured using an oscillator, a comparator, etc., and supplies gate signals X, Y, and Z to the transistors 61, 62, and 63, respectively, according to timings and conditions to be described in detail later.

The pixel unit 30 includes power supply terminals 31 and 32, an organic EL element 33, a switching transistor 34, a drive transistor 35, and a holding capacitor 36. The pixel unit 30 uses the voltage supplied from the power supply unit 60 as an operating power supply, holds a voltage signal supplied from data signal DATA in the holding capacitor 36, and causes the organic EL element 33 to emit light at a luminance corresponding to the voltage held in the holding capacitor 36.

The power supply unit 60 generates power supply voltage VTFT and power supply voltage VEL from input power supply voltages V− and V+ which are applied to input terminals 68 and 69. Power supply voltage VTFT is supplied to the power supply terminal 31 via power supply line 71, and power supply voltage VEL is supplied to the power supply terminal 32 via power supply line 72. Power supply voltage VTFT is for example a fixed voltage. Power supply voltage VEL is regulated by the switching regulator circuit to equal a voltage VEL0 of the signal line 51. At least two types of voltages VEL0 are instructed through the signal line 51 for the purpose of controlling the light emission and non-light-emission of the pixel unit 30. The at least two types of voltage VEL0 may be, for example, voltage VL whose difference from power supply voltage VTFT is larger than the threshold voltage of the organic EL element 33, and voltage VH which is less than or equal to the threshold voltage. The power supply voltage VEL changes between voltage VL and voltage VH, following voltage VEL0.

Here, power supply voltages VTFT and VEL are examples of the first power supply voltage and the second power supply voltage, respectively; and the power supply lines 71 and 72 are examples of the first power supply line and the second power supply line, respectively. Furthermore, voltages VH and VL which can be assumed by power supply voltage VEL are examples of the first voltage and the second voltage, respectively. Furthermore, the transistors 61, 62, and 63 are examples of the first switch element, the second switch element, and the third switch element, respectively. The transistors 61, 62, and 63 can be configured of a thin-film transistor of either the n-type or the p-type. Of the electrodes of the capacitor 64, the electrode illustrated at the bottom side and the electrode illustrated at the top side in FIG. 2 correspond to the first electrode and the second electrode, respectively. A constant voltage is applied to the first electrode of the capacitor 64. Furthermore, of the terminals of the inductor 65, the terminal illustrated on the right side and the terminal illustrated on the left side in FIG. 2 correspond to the first terminal and the second terminal, respectively.

Figure 3:
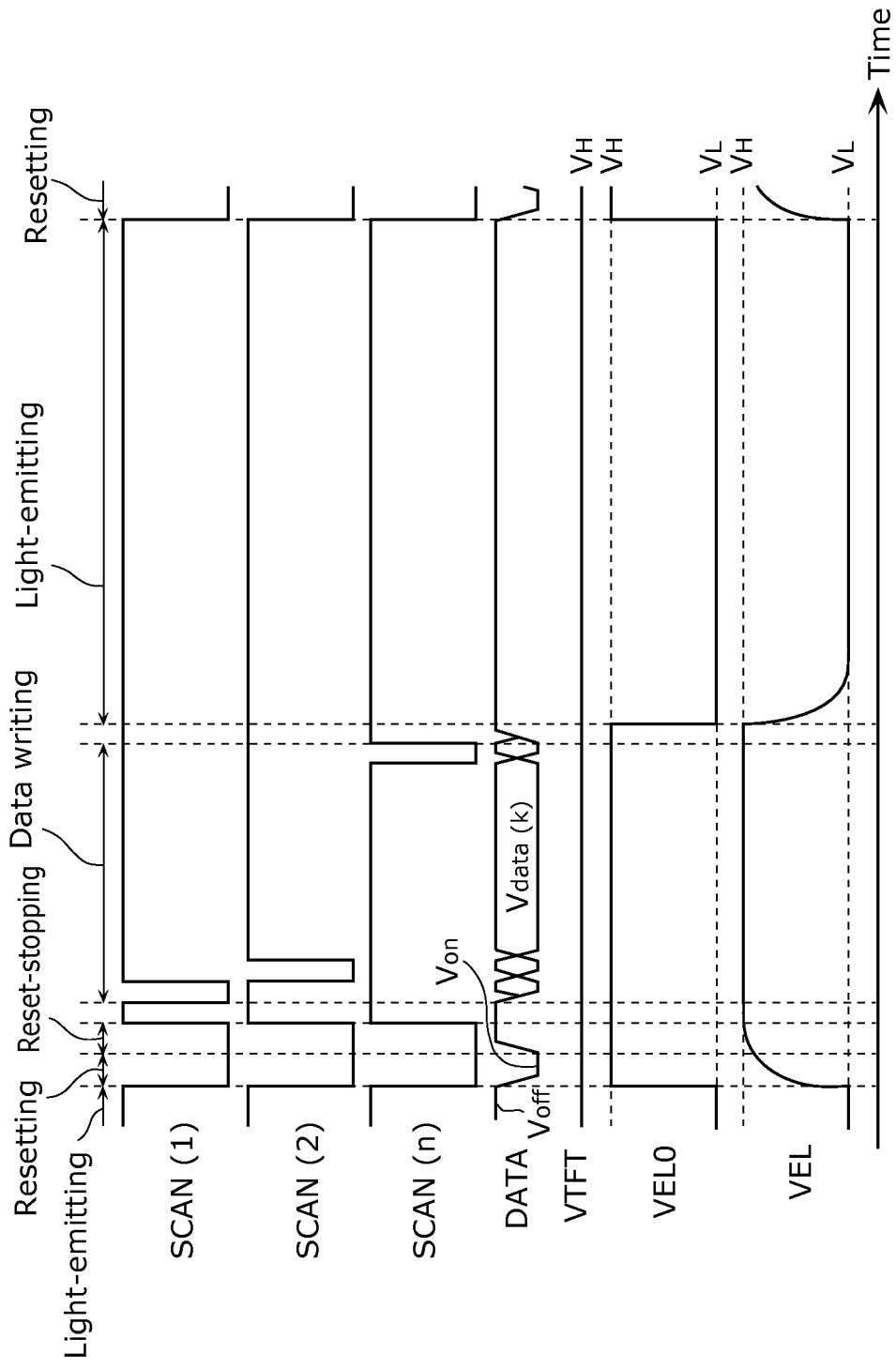
FIG. 3 is a timing chart for describing an example of a drive timing of a display panel in an embodiment.

FIG. 3 is a timing chart for describing an example of a drive timing of the display panel 1. FIG. 3 illustrates, for a 1-frame period, examples of: control signal SCAN (k) to be set to the scanning signal line 43 in each of the rows; data signal DATA to be set to the data signal line 41; power supply voltage VTFT to be set to the power supply line 71; voltage VEL0 to be set to the signal line 51, and power supply voltage VEL to be supplied to the power supply line 72. In FIG. 3, the vertical axis denotes the level of each signal, and the horizontal axis represents the passing of time.

It should be noted that FIG. 3 illustrates, as examples, control signal SCAN (k) and data signal DATA which are used when the switching transistor 34 and the drive transistor 35 of the pixel unit 30 are configured using p-type thin-film transistors. In the case where the switching transistor 34 and the drive transistor 35 of the pixel unit 30 are configured using n-type thin-film transistors, the same operation as in the subsequent description is possible by using control signal SCAN (k) and data signal DATA whose waveforms in FIG. 3 have been vertically inverted.

In display panel 1, resetting steps, reset-stopping steps, data writing steps, and light-emitting steps are executed for each frame according to the signals illustrated in FIG. 3.

First, a resetting step is executed simultaneously on all rows in a non-light-emitting period after the light-emitting step of the preceding frame and before a light-emitting step of the current frame.

In the resetting step, the power supply unit 60 outputs power supply voltages VTFT and VEL with which the voltage between both electrodes of each of the organic EL elements 33 becomes lower than or equal to the threshold voltage of the organic EL element 33, to the power supply lines 71 and 72, respectively. As an example, the power supply unit 60 outputs a fixed voltage VH as power supply voltage VTFT. Furthermore, as an example, the power supply unit 60 regulates power supply voltage VEL to a voltage (voltage VH in the example illustrated) higher than or equal to a voltage obtained by deducting the threshold voltage of the organic EL element 33 from voltage VH, following voltage VEL0.

With this, the organic EL element 33 does not emit light regardless of the voltage applied to the gate electrode of the drive transistor.

The signal line drive unit 40 sets data signal DATA to voltage Von with which the gate electrode-source electrode voltage of the drive transistor becomes higher than the threshold voltage. The scanning line drive unit 42 sets control signal SCAN (k) to the low level simultaneously in all rows. With this, the drive transistors are placed in a conductive state simultaneously in all the rows.

By placing the drive transistors in the conducting state once ahead of the light-emitting step, change in threshold voltage Vth of the drive transistors is suppressed. As a result, in the subsequent light-emitting step, luminance error (for example, trailing during window scrolling) caused by the change in threshold voltage Vth of the drive transistors can be reduced, and thus display quality can be improved.

It should be noted that, at this time, power supply voltages VTFT and VEL are regulated to a voltage with which the voltage between both electrodes of each of the organic EL elements 33 becomes lower than or equal to the threshold voltage of the organic EL element 33, and thus the organic EL element 33 does not emit light. Therefore, deterioration of display contrast and increased power consumption caused by the unnecessary light-emission of the organic EL elements 33 do not occur.

Next, a reset-stopping step is simultaneously executed on all the rows.

In the reset-stopping step, the signal line drive unit 40 sets data signal DATA to voltage Voff with which the gate electrode-source electrode voltage of each of the drive transistors becomes lower than or equal to the threshold voltage of the drive transistor. With this, the drive transistor turns OFF, and the reset operation stops.

By executing of the reset-stopping step, the period for placing the drive transistors in the conducting state is made uniform for all of the rows. As a result, display-related problems such as residual images, trailing during window scrolling, misadjusted black level, and non-uniformity during raster display do not easily occur. It should be noted that, if such display-related problems are within an acceptable range of visibility even without executing the reset-stopping step, then the reset-stopping step may be omitted.

Next, the data writing step is executed in a different period for each row.

In the data writing step for a kth row, the signal line drive unit 40 outputs, as data signal DATA, voltage Vdata (k) corresponding to the luminance of the pixel units 30 in the kth row. The scanning line drive unit 42 sets control signal SCAN of the kth row to the low level. With this, voltage Vdata (k) is written into the pixel units 30 in the kth row.

Subsequently, the light-emitting step is simultaneously executed on all the rows.

In the light-emitting step, the power supply unit 60 outputs power supply voltages VTFT and VEL with which the voltage between both electrodes of each of the organic EL elements 33 becomes higher than the threshold voltage of the organic EL element 33, to the power supply lines 71 and 72, respectively. As an example, the power supply unit 60 outputs a fixed voltage VH as power supply voltage VTFT. Furthermore, as an example, the power supply unit 60 may regulate power supply voltage VEL to a voltage (voltage VL in the example illustrated) lower than a voltage obtained by deducting the threshold voltage of the organic EL element 33 from voltage VH, following voltage VEL0.

With this, the drive transistor supplies to the organic EL element 33 a current of a size that is in accordance with voltage Vdata (k) written in the pixel unit 30. As a result, the organic EL element emits light at a luminance corresponding to the size of the current supplied from the drive transistor.

With such an operation, power supply voltage VEL that is outputted to the power supply line 72 changes between voltage VH and voltage VL on a frame basis. As pointed out as a problem earlier, when causing power supply voltage VEL outputted to the power supply line 72 to change, the power loss for charging/discharging the parasitic capacitance 70 of the power supply line 72 can be a cause for the deterioration of power efficiency in the display panel 1. Since the power supply unit 60 collects power and regenerates the collected power in order to charge the parasitic capacitance 70 of the power supply line 72, such power loss is reduced.

The operation performed by the power supply unit 60 to reduce such power loss is described in detail below.

Figure 4:
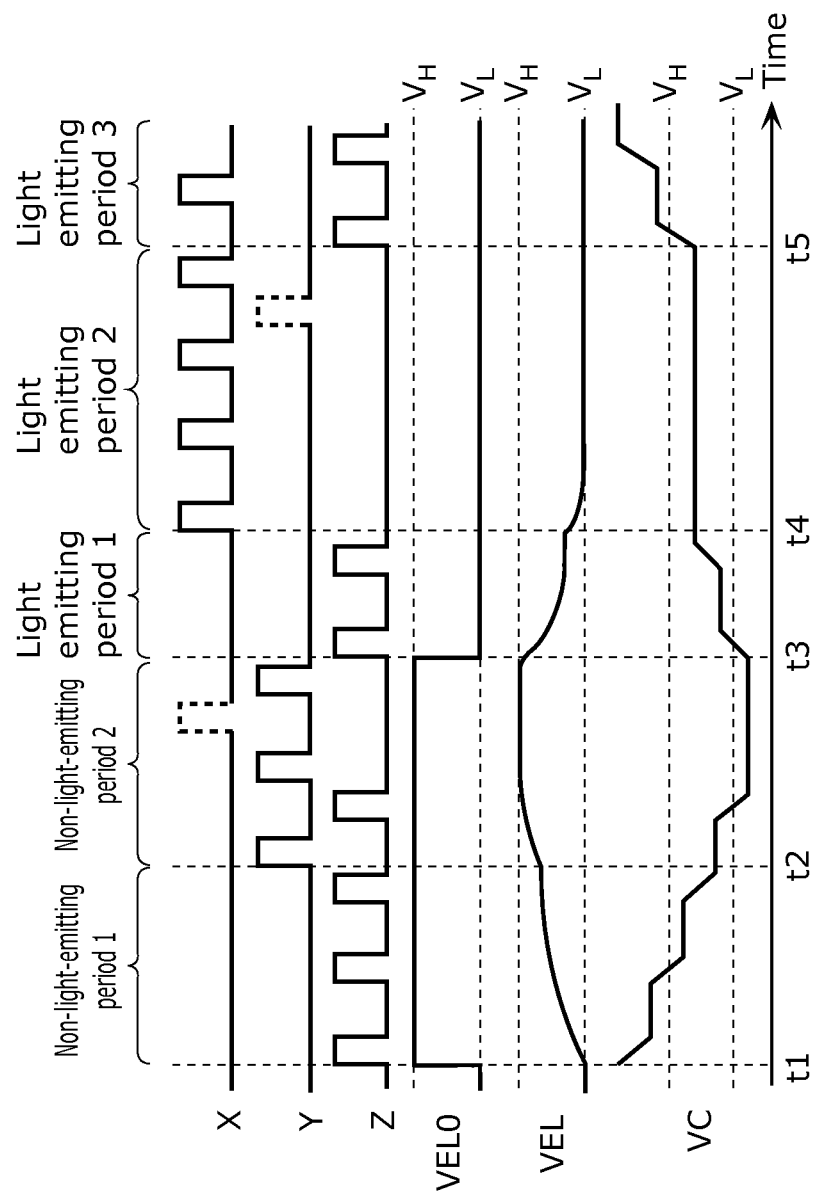
FIG. 4 is a timing chart illustrating examples of major signals of a power supply unit and a pixel unit in an embodiment.

FIG. 4 is a timing chart illustrating examples of major signals of the power supply unit 60 and the pixel unit 30. FIG. 4 illustrates, for a 1-frame period, examples of: gate signals X, Y, and Z of the transistors 61, 62, and 63, respectively; voltage VEL0; power supply voltage VEL; and voltage VC of the second electrode of the capacitor 64. In FIG. 4, the vertical axis denotes the level of each signal, and the horizontal axis represents the passing of time.

Non-light-emitting period 1 and non-light-emitting period 2 in FIG. 3 correspond to the resetting, reset-stopping, and data writing periods (i.e., all the periods other than the light-emitting period) in FIG. 3. Light-emitting period 1, light-emitting period 2, and light-emitting period 3 in FIG. 4 correspond to the light-emitting period in FIG. 3.

It should be noted that FIG. 4 illustrates, as examples, gate signals X, Y, and Z which are used when the transistors 61, 62, and 63 of the power source unit 60 are configured using n-type thin-film transistors. In the case where the transistors 61, 62, and 63 of the power source unit 60 are configured using p-type thin-film transistors, the same operation as in the subsequent description is possible by using gate signals X, Y, and Z whose waveforms in FIG. 4 have been vertically inverted.

Each of FIG. 5A to FIG. 5E is a circuit diagram illustrating an example of the operation of the power supply unit 60 in non-light-emitting period 1, non-light-emitting period 2, light-emitting period 1, light-emitting period 2, and light-emitting period 3. Arrows illustrated in the circuit diagrams represent the path of current in the respective periods.

In non-light-emitting period 1 and non-light-emitting period 2, power supply voltage VEL is regulated to voltage VH.

At the start of non-light-emitting period 1, power supply voltage VEL is VL. Furthermore, capacitor 64 is charged so that voltage VC of the second electrode is a voltage higher than at least VL in light-emitting period 3 of the preceding frame.

In non-light-emitting period 1, the switching control unit 66 sets only gate signal Z, among gate signals X, Y, and Z, to the high level to place transistor 63 in the conducting state.

Figure 5A:
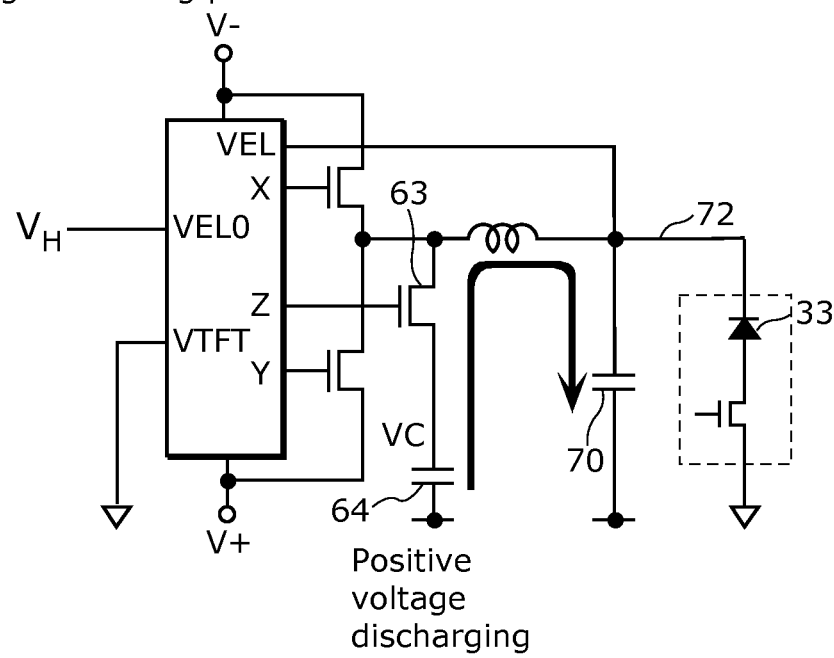
FIG. 5A is a circuit diagram illustrating an example of an operation of a power supply unit in an embodiment.

As illustrated in FIG. 5A, the parasitic capacitance 70 of the power supply line 72 is charged with the voltage that is charged to the capacitor 64, and power supply voltage VEL rises without consuming power from the input power supply voltage. When power supply voltage VEL becomes higher than or equal to a voltage obtained by deducting the threshold voltage of the organic EL element 33 from voltage VH, the organic EL element 33 becomes incapable of emitting light.

In non-light-emitting period 2, switching control unit 66 alternately sets gate signals Y and Z to the high level to place the transistors 62 and 63 in mutually-exclusive states of conduction.

Figure 5B:
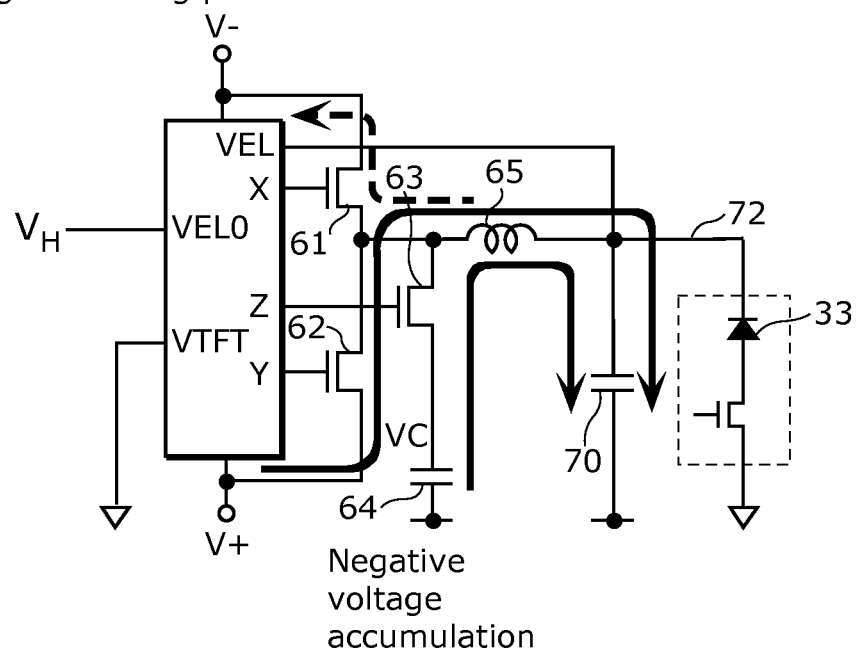
FIG. 5B is a circuit diagram illustrating an example of an operation of a power supply unit in an embodiment.

As illustrated in FIG. 5B, by placing the transistor 62 in the conducting state, the parasitic capacitance 70 of the power supply line 72 is charged with the power from the input power supply voltage, and power supply voltage VEL rises further and reaches the target voltage VH.

When the transistor 62 is placed in the conducting state, a part of the power from the input power supply voltage is accumulated in the inductor 65. When the transistor 63 is placed in the conducting state, the capacitor 64 is charged with the power held in the inductor 65, and voltage VC of the second electrode drops.

Power supply voltage VEL is fed back to the switching control unit 66 via a sense line 73. When power supply voltage VEL to be fed back becomes higher than voltage VH, the switching control unit 66 may set gate signal X to the high level, as indicated by the broken line in FIG. 4 and FIG. 5B, in order to cause power supply voltage VEL to drop rapidly until voltage VH.

In light-emitting period 1, light-emitting period 2, and light-emitting period 3, power supply voltage VEL is regulated to voltage VL.

At the start of light-emitting period 1, power supply voltage VEL is VH. Furthermore, capacitor 64 is charged so that voltage VC of the second electrode is a voltage lower than at least VH in non-light-emitting period 2.

In light-emitting period 1, the switching control unit 66 sets only gate signal Z, among gate signals X, Y, and Z, to the high level to place the transistor 63 in the conducting state.

Figure 5C:
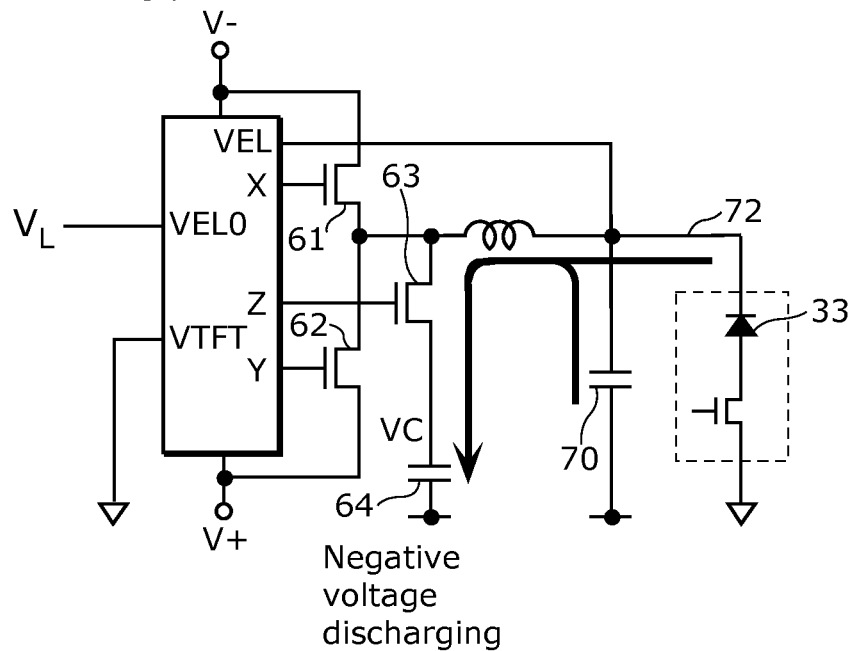
FIG. 5C is a circuit diagram illustrating an example of an operation of a power supply unit iii an embodiment.

As illustrated in FIG. 5C, the parasitic capacitance 70 of the power supply line 72 is charged with the voltage that is charged to the capacitor 64, and power supply voltage VEL drops without consuming power from the input power supply voltage. When power supply voltage VEL becomes lower than or equal to a voltage obtained by deducting the threshold voltage of the organic EL element 33 from voltage VH, the organic EL element 33 becomes capable of emitting light.

In light-emitting period 2, the switching control unit 66 sets gate signal X to the high level to place the transistor 61 in the conducting state.

Figure 5D:
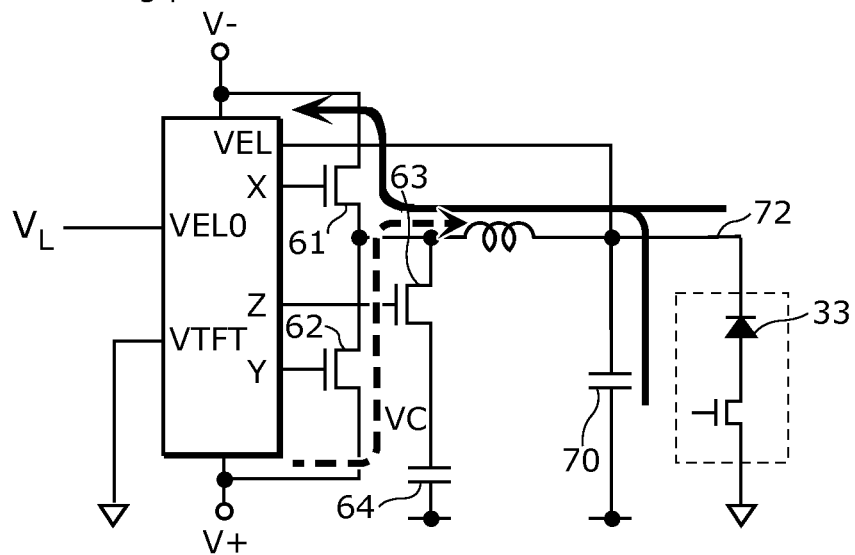
FIG. 5D is a circuit diagram illustrating an example of an operation of a power supply unit in an embodiment.

As illustrated in FIG. 5D, by placing the transistor 61 in the conducting state, the organic EL element emits light with the power from the input power supply voltage. Along with this, the parasitic capacitance 70 of the power supply line 72 is charged, and power supply voltage VEL drops further and reaches the target voltage VL.

Power supply voltage VEL is fed back to the switching control unit 66 via the sense line 73. When power supply voltage VEL to be fed back becomes lower than voltage VL, the switching control unit 66 may set gate signal Y to the high level, as indicated by the broken line in FIG. 4 and FIG. 5D, in order to cause power supply voltage VEL to rise rapidly until voltage VL.

In light-emitting period 3, the switching control unit 66 alternately sets gate signals X and Z to the high level to place the transistors 61 and 63 in mutually-exclusive states of conduction.

Figure 5E:
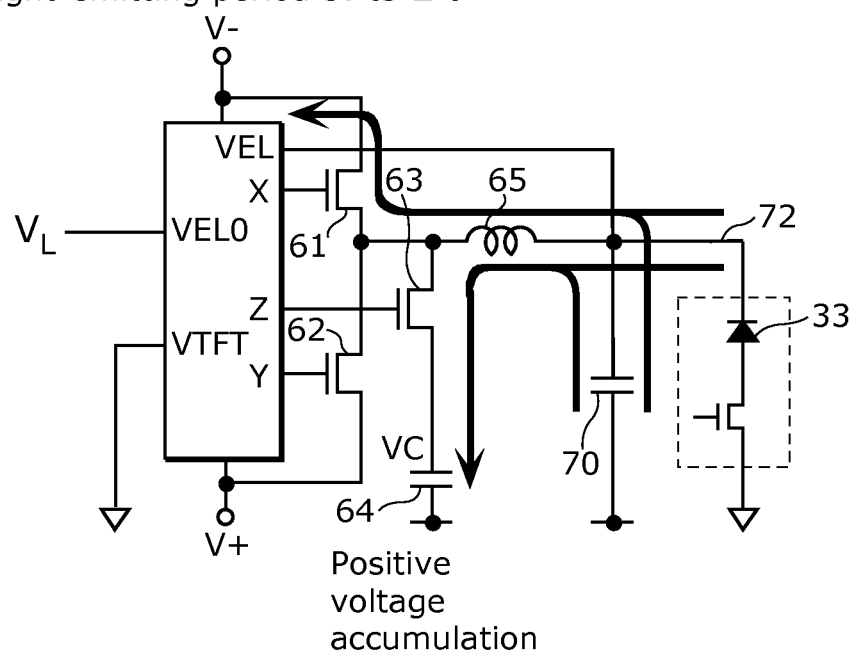
FIG. 5E is a circuit diagram illustrating an example of an operation of a power supply unit in an embodiment.

As illustrated in FIG. 5E, by placing the transistor 61 in the conducting state, the organic EL element 33 continues to emit light with the power from the input power supply voltage. Along with this, the parasitic capacitance 70 of the power supply line 72 is charged, and power supply voltage VEL is maintained at the target voltage VL.

When the transistor 61 is placed in the conducting state, a part of the power from the input power supply voltage is accumulated in the inductor 65. When the transistor 63 is placed in the conducting state, the capacitor 64 is charged with the power held in the inductor 65, and voltage VC of the second electrode rises.

The voltage that is charged to the capacitor 64 is to be used for charging the parasitic capacitance 70 of the power supply line 72 in the non-light-emitting period 1 of the subsequent frame.

The above-described operation includes two sets of operations of collecting power from the parasitic capacitance 70 of the power supply line 72, and regenerating the collected power. Specifically, the first is an operation of regenerating the power collected in light-emitting period 3, in non-light-emitting period 1 of the subsequent frame (in the foregoing example, the operation of charging the capacitor 64 with a voltage higher than VL, and discharging the higher voltage that is charged toward the parasitic capacitance 70 holding voltage VL. The second is an operation of regenerating the power collected in non-light-emitting period 2, in light-emitting period 1 (in the foregoing example, the operation of charging the capacitor 64 with a voltage lower than VH, and discharging the lower voltage that is charged toward the parasitic capacitance 70 holding voltage VH).

However, performing both of these operations is not essential to the present disclosure. This is because the power loss reducing effect can be obtained as long as one of these operations is performed. For example, power loss can be significantly reduced by merely performing the operation of regenerating the power collected in light-emitting period 3 in which a relatively large current flows in the inductor 65, in the non-light-emitting period 1 of the subsequent frame. If, on top of this, the operation of regenerating the power collected in non-light-emitting period 2, in light-emitting period 1 is performed, a greater effect can be obtained for reducing power loss.

Figure 6:
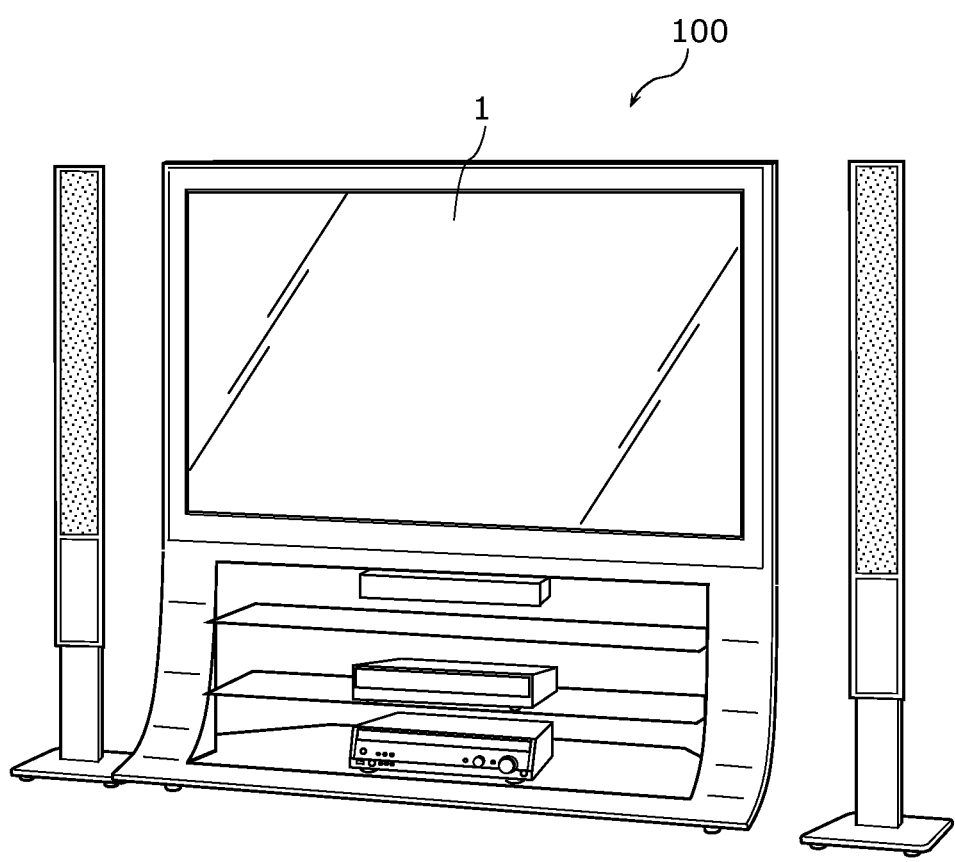
FIG. 6 is an external view illustrating an example of a thin flat-screen TV using the display device according to the present invention.

FIG. 6 is an external view illustrating the external appearance of a television set 100 using the display panel 1. As a result of being able to reduce power loss by using display panel 1, the television set 100 having excellent power-saving performance can be implemented.

The display device according to the present disclosure has been described thus far based on an embodiment. However, the present disclosure is not limited to the foregoing embodiment. Forms obtained by various modifications to respective embodiments that can be conceived by a person of skill in the art as well as forms implemented by combining structural elements in different embodiments which are within the essence of the present disclosure are included in the scope of the present disclosure.

In the foregoing embodiment, the voltage supplied to the anode of the organic EL element 33 is fixed and the voltage supplied to the cathode is changed. However, conversely, the voltage supplied to the anode of the organic EL element 33 may be fixed and the voltage supplied to the cathode may be changed, for example.

Figure 7:
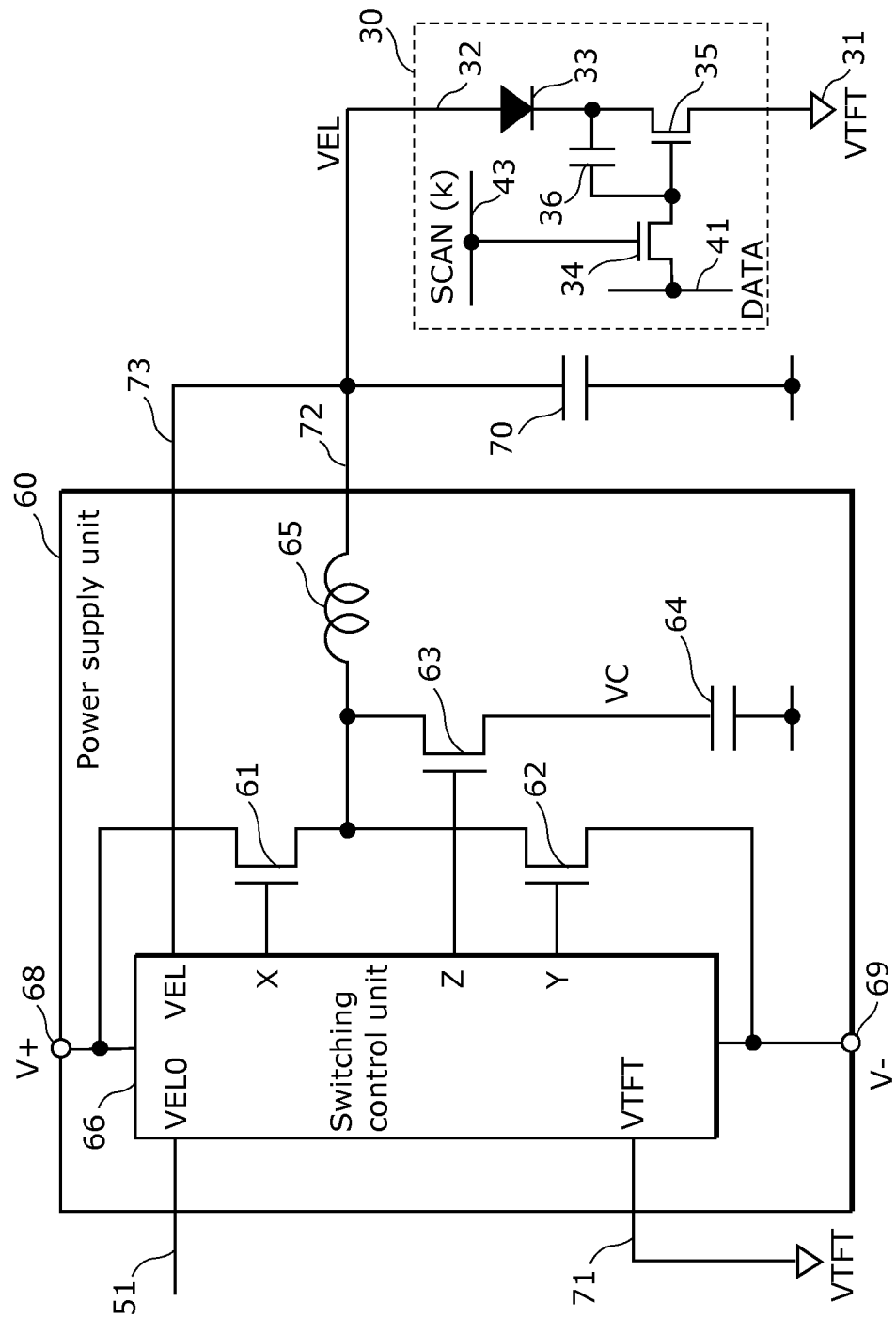
FIG. 7 is a circuit diagram illustrating an example of configurations of a power supply unit and a pixel unit in a variation.

FIG. 7 is a circuit diagram illustrating an example of the configurations of the power supply unit 60 and a pixel unit 30 and the connection between the power supply unit 60 and the pixel unit 30 in the case where the voltage supplied to the anode of the organic EL element 33 is to be changed. In FIG. 7, the point of supplying input power supply voltages V+ and V− to input terminals 68 and 69 of the switching control unit 66, and the connection between the organic EL element 33 and the holding capacitor 36 of the pixel unit 30 have been changed compared to those in FIG. 2.

Figure 8:
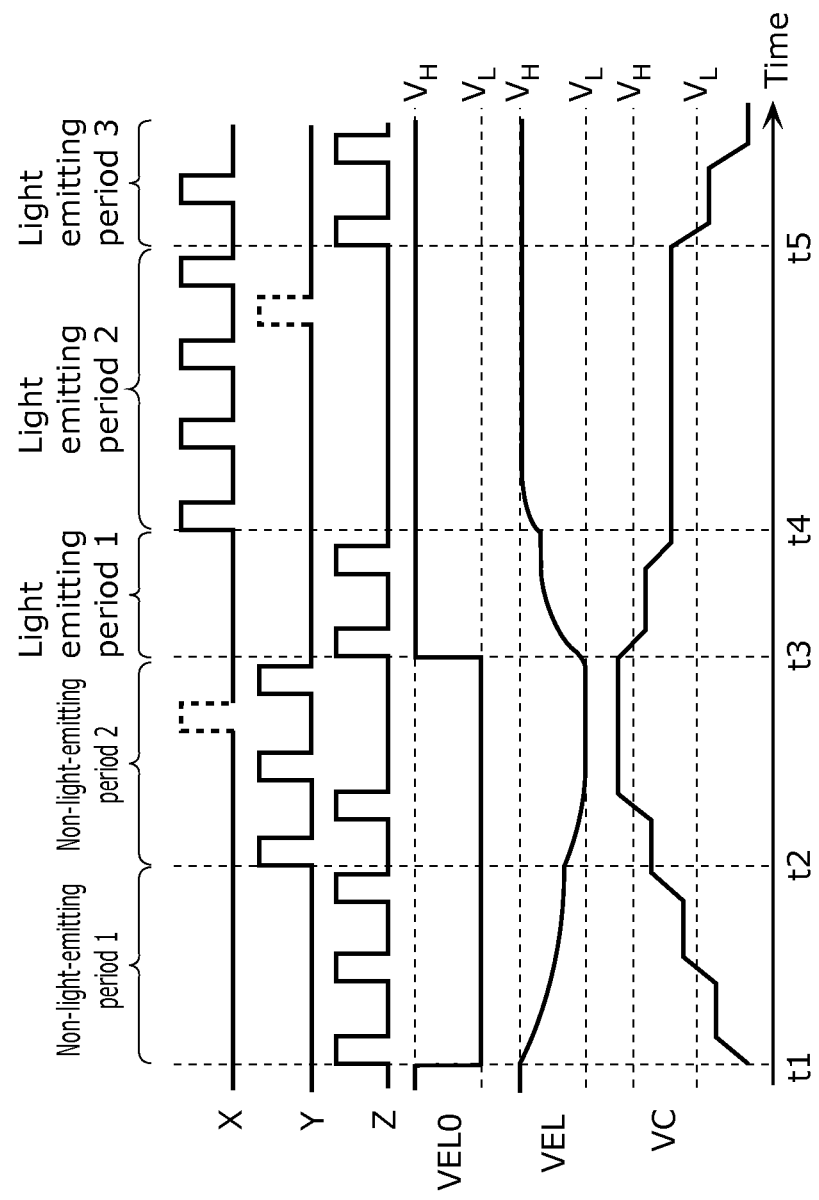
FIG. 8 is a timing chart illustrating examples of major signals of a power supply unit and a pixel unit in a variation.

FIG. 8 is a timing chart illustrating examples of major signals of the power supply unit 60 and the pixel unit 30. FIG. 8 illustrates, for a 1-frame period, examples of: gate signals X, Y, and Z of the transistors 61, 62, and 63, respectively; voltage VEL0; power supply voltage VEL; and voltage VC of the second electrode of the capacitor 64. In FIG. 8, the vertical axis denotes the level of each signal, and the horizontal axis represents the passing of time.

Non-light-emitting period 1 and non-light-emitting period 2 in FIG. 8 correspond to the resetting, reset-stopping, and data writing periods (i.e., all the periods other than the light-emitting period) in FIG. 3. Light-emitting period 1, light-emitting period 2, and light-emitting period 3 in FIG. 8 correspond to the light-emitting period in FIG. 3. FIG. 8 is different from FIG. 4 in that the polarities of voltage VEL0, power supply voltage VEL, and voltage VC of the second electrode of capacitor 64 are inverted. More specifically, with regard to voltage VEL0, power supply voltage VEL, and voltage VC, VH in FIG. 4 corresponds to VL in FIG. 8, and VL in FIG. 4 corresponds to VH in FIG. 8.

Each of FIG. 9A to FIG. 9E is a circuit diagram illustrating an example of the operation of the power supply unit 60 in non-light-emitting period 1, non-light-emitting period 2, light-emitting period 1, light-emitting period 2, and light-emitting period 3. Arrows illustrated in the circuit diagrams represent the path of current in the respective periods.

In non-light-emitting period 1 and non-light-emitting period 2, power supply voltage VEL is regulated to voltage VL.

At the start of non-light-emitting period 1, power supply voltage VEL is VH. Furthermore, capacitor 64 is charged so that voltage VC of the second electrode is a voltage lower than at least VH in light-emitting period 3 of the preceding frame.

In non-light-emitting period 1, the switching control unit 66 sets only gate signal Z, among gate signals X, Y, and Z, to the high level to place transistor 63 in the conducting state.

Figure 9A:
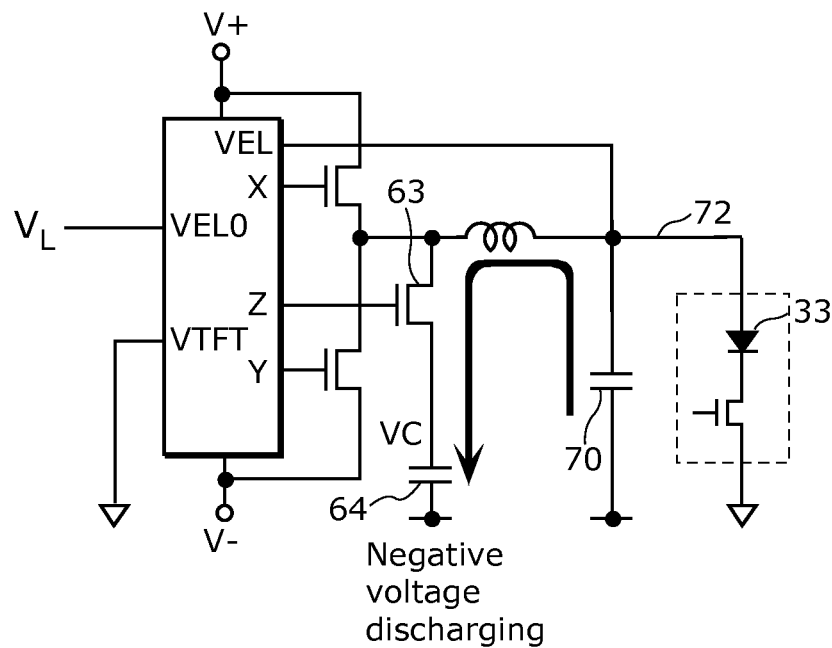
FIG. 9A is a circuit diagram illustrating an example of an operation of a power supply unit in a variation.

As illustrated in FIG. 9A, the parasitic capacitance 70 of the power supply line 72 is charged with the voltage that is charged to the capacitor 64, and power supply voltage VEL drops without consuming power from the input power supply voltage. When power supply voltage VEL becomes lower than a voltage obtained by adding the threshold voltage of the organic EL element 33 to voltage VL, the organic EL element 33 becomes incapable of emitting light.

In non-light-emitting period 2, switching control unit 66 alternately sets gate signals Y and Z to the high level to place the transistors 62 and 63 in mutually-exclusive states of conduction.

Figure 9B:
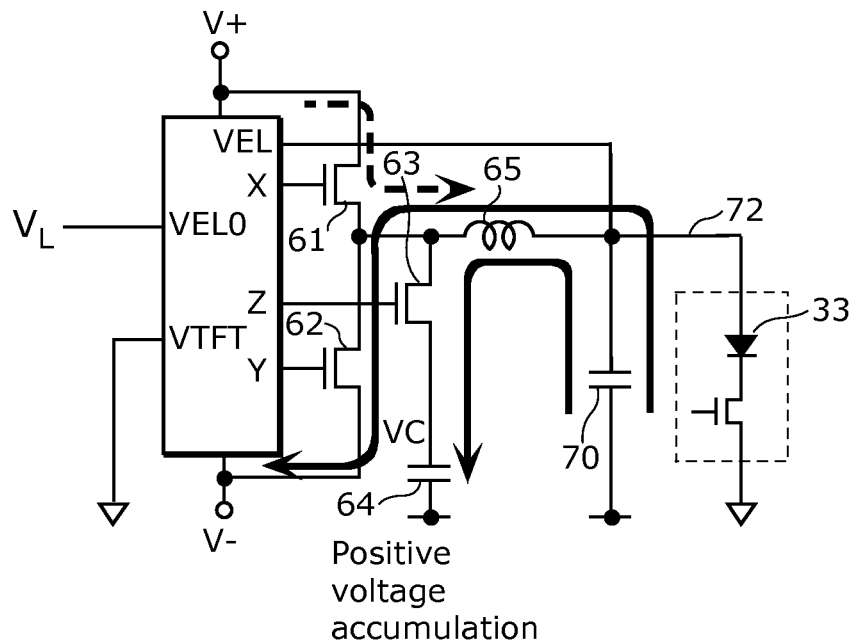
FIG. 9B is a circuit diagram illustrating an example of an operation of a power supply unit in a variation.

As illustrated in FIG. 9B, by placing the transistor 62 in the conducting state, the parasitic capacitance 70 of the power supply line 72 is charged with the power from the input power supply voltage, and power supply voltage VEL drops further and reaches the target voltage VL.

When the transistor 62 is placed in the conducting state, a part of the power from the input power supply voltage is accumulated in the inductor 65. When the transistor 63 is placed in the conducting state, the capacitor 64 is charged with the power held in the inductor 65, and voltage VC of the second electrode rises.

Power supply voltage VEL is fed back to the switching control unit 66 via the sense line 73. When power supply voltage VEL to be fed back becomes lower than voltage VL, the switching control unit 66 may set gate signal X to the high level, as indicated by the broken line in FIG. 8 and FIG. 9B, in order to cause power supply voltage VEL to rise rapidly until voltage VL.

In light-emitting period 1, light-emitting period 2, and light-emitting period 3, power supply voltage VEL is regulated to voltage VH.

At the start of light-emitting period 1, power supply voltage VEL is VL. Furthermore, capacitor 64 is charged so that voltage VC of the second electrode is a voltage higher than at least VL in non-light-emitting period 2.

In light-emitting period 1, the switching control unit 66 sets only gate signal Z, among gate signals X, Y, and Z, to the high level to place the transistor 63 in the conducting state.

Figure 9C:
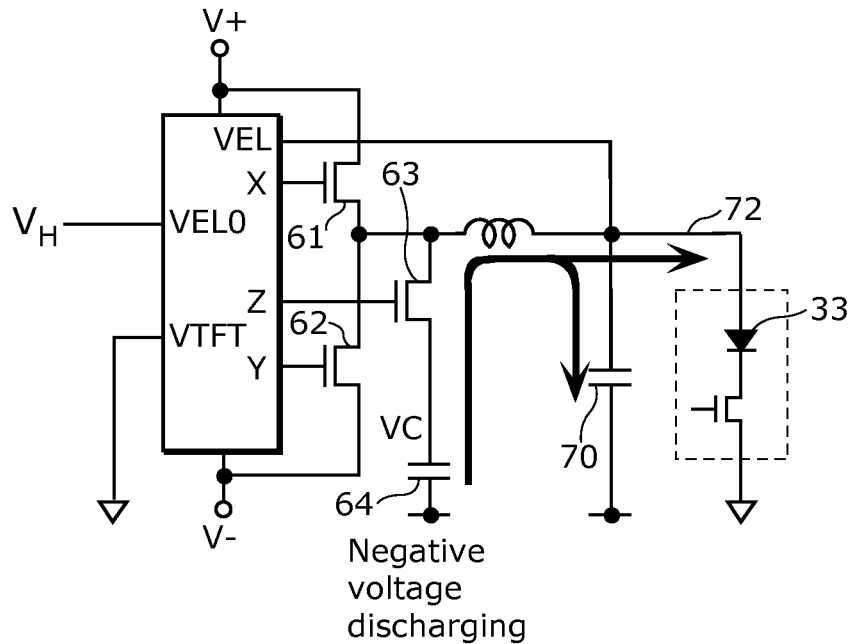
FIG. 9C is a circuit diagram illustrating an example of an operation of a power supply unit in a variation.

As illustrated in FIG. 9C, the parasitic capacitance 70 of the power supply line 72 is charged with the voltage that is charged to the capacitor 64, and power supply voltage VEL rises without consuming power from the input power supply voltage. When power supply voltage VEL becomes higher than or equal to a voltage obtained by adding the threshold voltage of the organic EL element 33 to voltage VL, the organic EL element 33 becomes capable of emitting light.

In light-emitting period 2, the switching control unit 66 sets gate signal X to the high level to place the transistor 61 in the conducting state.

Figure 9D:
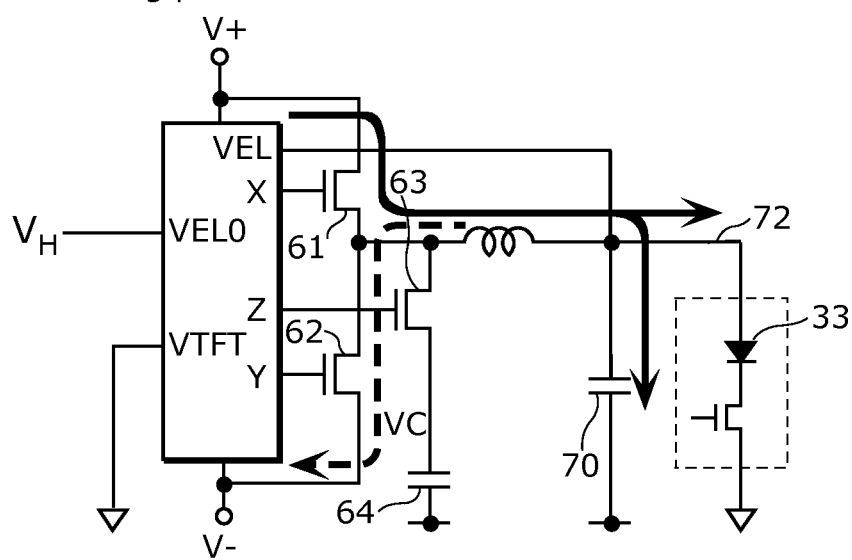
FIG. 9D is a circuit diagram illustrating an example of an operation of a power supply unit in a variation.

As illustrated in FIG. 9D, by placing the transistor 61 in the conducting state, the organic EL element 33 emits light with the power from the input power supply voltage and the parasitic capacitance 70 of the power supply line 72 is charged, and power supply voltage VEL rises further and reaches the target voltage VH.

Power supply voltage VEL is fed back to the switching control unit 66 via the sense line 73. When power supply voltage VEL to be fed back becomes higher than voltage VH, the switching control unit 66 may set gate signal Y to the high level, as indicated by the broken lines in FIG. 8 and FIG. 9D, in order to cause power supply voltage VEL to drop rapidly until voltage VH.

In light-emitting period 3, switching control unit 66 alternately sets gate signals X and Z to the high level to place the transistors 61 and 63 in mutually-exclusive states of conduction.

Figure 9E:
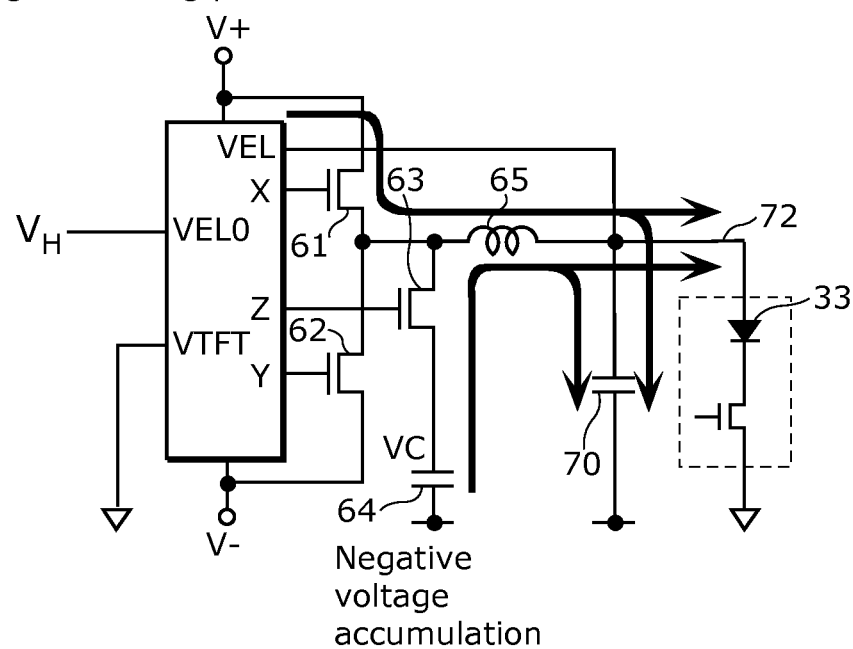
FIG. 9E is a circuit diagram illustrating an example of an operation of a power supply unit in a variation.

As illustrated in FIG. 9E, by placing the transistor 61 in the conducting state, the organic EL element 33 continues to emit light with the power from the input power supply voltage and the parasitic capacitance 70 of the power supply line 72 is charged, and power supply voltage VEL is maintained at the target voltage VH.

When the transistor 61 is placed in the conducting state, a part of the power from the input power supply voltage is accumulated in the inductor 65. When the transistor 63 is placed in the conducting state, the capacitor 64 is charged with the power held in the inductor 65, and voltage VC of the second electrode drops.

The voltage that is charged to the capacitor 64 is to be used for charging the parasitic capacitance 70 of the power supply line 72 in the non-light-emitting period 1 of the subsequent frame.

In this manner, even in the case where the voltage supplied to the anode of the organic EL element 33 is changed, power can be collected from the parasitic capacitance 70 of the power supply line 72 and regenerated in the same manner as when the voltage supplied to the cathode of the organic EL element 33 is changed.

Furthermore, in the foregoing embodiment and variation, the voltage to be supplied to the cathode or the anode of the organic EL element 33 is changed in the power supply line 72. However, the voltage to be supplied to the source or the drain of the drive transistor 35 may be changed in the power supply line 72.

Figure 10:
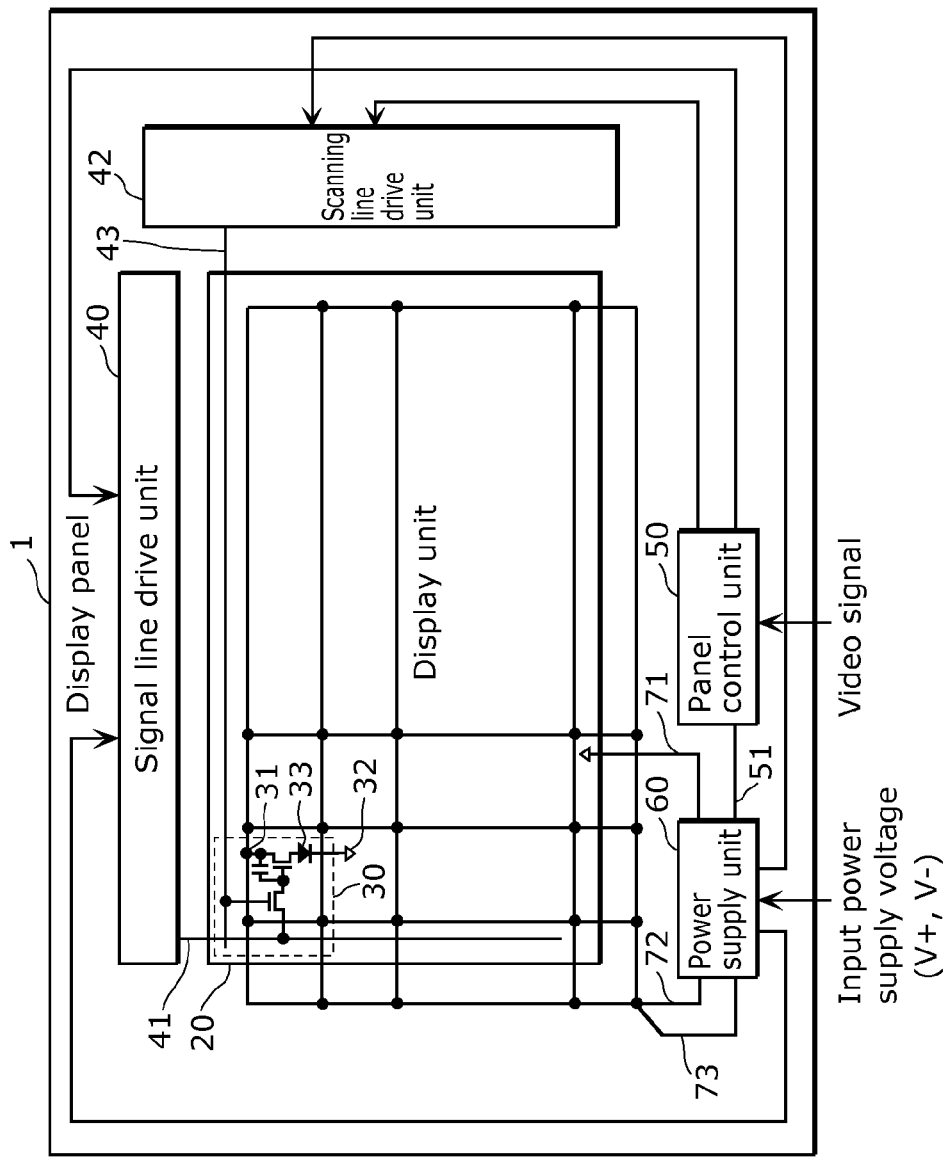
FIG. 10 is a function block diagram illustrating an example of a display device including a display panel in a variation.

FIG. 10 is a function block diagram illustrating an example of a display device including a display panel in the case where the voltage to be supplied to the source of the drive transistor 35 is changed in the power supply line 72.

Figure 11:
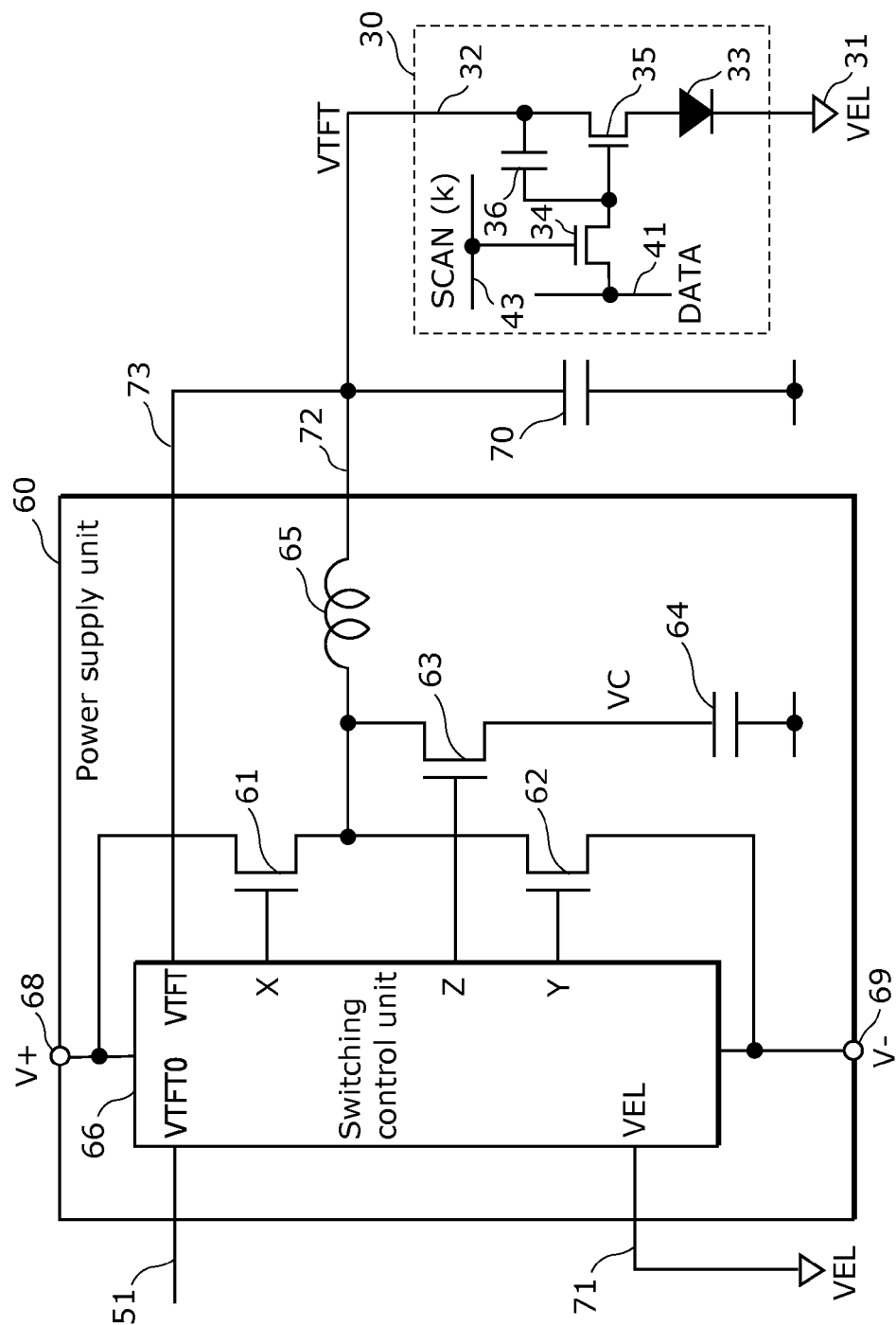
FIG. 11 is a circuit diagram illustrating an example of configurations of a power supply unit and a pixel unit in a variation.

FIG. 11 is a circuit diagram illustrating an example of configurations of a power supply unit and a pixel unit.

In FIG. 10 and FIG. 11, the point of the power supply unit 60 supplying the generated power supply voltage VTFT and power supply voltage VEL to the power supply terminals 31 and 32 of the pixel unit 30 via power supply lines 72 and 71, respectively, has been changed compared to those in FIG. 1 and FIG. 2. In addition, the connection between the organic EL element 33 and the holding capacitor 36 of pixel unit 30 has also been changed.

Power supply voltage VEL is for example a fixed voltage. Power supply voltage VTFT is adjusted to be equal to voltage VTFT0 of signal line 51. At least two types of voltages VEL0 are instructed through the signal line 51 for the purpose of controlling the light emission and non-light-emission of the pixel unit 30. The at least two types of voltage VEL0 may be, for example, voltage VH whose difference from power supply voltage VEL is greater than the threshold voltage of the organic EL element 33, and voltage VL which is less than or equal to the threshold voltage. Power supply voltage VEL changes between voltage VH and voltage VL, following voltage VEL0.

In this manner, even in the case where the voltage supplied to the source of the drive transistor 35 is changed in the power supply line 72, power can be collected from the parasitic capacitance 70 of the power supply line 72 and regenerated in the same manner as when the voltage supplied to the cathode or the anode of the organic EL element 33 is changed in the power supply line 72.

INDUSTRIAL APPLICABILITY

The present disclosure can be applied to a video display device such as an organic EL display device.

REFERENCE SIGNS LIST 1 display panel
20 display unit
30 pixel unit
31, 32 power supply terminal
33 organic EL element (light-emitting element)
34 switching transistor
35 drive transistor
36 holding capacitor
40 signal line drive unit
41 data signal line
42 scanning line drive unit
43 scanning signal line
50 panel control unit
51 signal line
60 power supply unit
61-63 transistor (switch element)
64 capacitor
65 inductor
66 switching control device
70 parasitic capacitance
71, 72 power supply line
73 sense line
100 television set

The invention claimed is:

1. A display panel comprising:
a plurality of light-emitting elements;
a power supply unit configured to generate, from an input power supply voltage, a first power supply voltage used for light emission by the plurality of light-emitting elements and a second power supply voltage which is variable;
a first power supply line that transmits the first power supply voltage from the power supply unit to the plurality of light-emitting elements; and
a second power supply line that transmits the second power supply voltage from the power supply unit to the plurality of light-emitting elements,
wherein the power supply unit includes:
a pair of input terminals to which the input power supply voltage is applied;
a switching control unit;
an inductor having a first terminal connected to the second power supply line;
a first switch element that is controlled by the switching control unit and switches between a conducting state and a non-conducting state between a second terminal of the inductor and one of the pair of input terminals;
a second switch element that is controlled by the switching control unit and switches between the conducting state and the non-conducting state between the second terminal of the inductor and the other of the pair of input terminals;
a capacitor having a first electrode to which a constant voltage is applied; and
a third switch element that is controlled by the switching control unit and switches between the conducting state and the non-conducting state between the second terminal of the inductor and a second electrode of the capacitor, and the switching control unit is configured to:
place (i) one of the first switch element and the second switch element and (ii) the third switch element in mutually-exclusive states of conduction to accumulate electric charge in the capacitor using current flowing to the inductor, when the second power supply voltage is set to a first voltage; and
place the third switch element in the conducting state to charge a parasitic capacitance of the second power supply line using the electric charge accumulated in the capacitor, when the second power supply voltage is changed from the first voltage to a second voltage.

2. The display panel according to claim 1,
wherein the switching control unit is configured to:
place the second switch element and the third switch element in the mutually-exclusive states of conduction to accumulate the electric charge in the capacitor using the current flowing to the inductor, in a light-emitting period of the light-emitting element; and
place the third switch element in the conducting state to charge the parasitic capacitance of the second power supply line using the electric charge accumulated in the capacitor, in a non-light-emitting period of the light-emitting element.

3. The display panel according to claim 1,
wherein the switching control unit is configured to:
place the second switch element and the third switch element in the mutually-exclusive states of conduction to accumulate the electric charge in the capacitor using the current flowing to the inductor, in a non-light-emitting period of the light-emitting element; and
place the third switch element in the conducting state to charge the parasitic capacitance of the second power supply line using the electric charge accumulated in the capacitor, in a light-emitting period of the light-emitting element.

4. A method of driving a display panel,
the display panel including:
a plurality of light-emitting elements;
a power supply unit configured to generate, from an input power supply voltage, a first power supply voltage used for light emission by the plurality of light-emitting elements and a second power supply voltage which is variable;
a first power supply line that transmits the first power supply voltage from the power supply unit to the plurality of light-emitting elements; and
a second power supply line that transmits the second power supply voltage from the power supply unit to the plurality of light-emitting elements,
wherein the power supply unit includes:
a pair of input terminals to which the input power supply voltage is applied;
a switching control unit;
an inductor having a first terminal connected to the second power supply line;
a first switch element that is controlled by the switching control unit and switches between a conducting state and a non-conducting state between a second terminal of the inductor and one of the pair of input terminals;
a second switch element that is controlled by the switching control unit and switches between the conducting state and the non-conducting state between the second terminal of the inductor and the other of the pair of input terminals;
a capacitor having a first electrode to which a constant voltage is applied; and
a third switch element that is controlled by the switching control unit and switches between the conducting state and the non-conducting state between the second terminal of the inductor and a second electrode of the capacitor,
the method comprising:
(A) placing (i) one of the first switch element and the second switch element and (ii) the third switch element in mutually-exclusive states of conduction to accumulate electric charge in the capacitor using current flowing to the inductor, when the second power supply voltage is set to a first voltage; and
(B) placing the third switch element in the conducting state to charge a parasitic capacitance of the second power supply line using the electric charge accumulated in the capacitor, when the second power supply voltage is changed from the first voltage to a second voltage.

5. The method according to claim 4, wherein:
in step (A), the second switch element and the third switch element are placed in the mutually-exclusive states of conduction to accumulate the electric charge in the capacitor using the current flowing to the inductor, in a light-emitting period of the light-emitting element; and
in step (B), the third switch element is placed in the conducting state to charge the parasitic capacitance of the second power supply line using the electric charge accumulated in the capacitor, in a non-light-emitting period of the light-emitting element.

6. The method according to claim 4, wherein:
in step (A), the second switch element and the third switch element are placed in the mutually-exclusive states of conduction to accumulate the electric charge in the capacitor using the current flowing to the inductor, in a non-light-emitting period of the light-emitting element; and
in step (B), the third switch element is placed in the conducting state to charge the parasitic capacitance of the second power supply line using the electric charge accumulated in the capacitor, in a light-emitting period of the light-emitting element.

* * * * *